(No Model.)

J. M. BYRON.
SUPPLY SYSTEM FOR ELECTRIC RAILWAYS.

No. 536,915. Patented Apr. 2, 1895.

WITNESSES:
H. Walker
H. B. Hutchinson

INVENTOR
J. M. Byron
BY
Munn & Co
ATTORNEYS.

UNITED STATES PATENT OFFICE.

JOHN M. BYRON, OF NEW YORK, N. Y.

SUPPLY SYSTEM FOR ELECTRIC RAILWAYS.

SPECIFICATION forming part of Letters Patent No. 536,915, dated April 2, 1895.

Application filed June 16, 1894. Serial No. 514,760. (No model.)

*To all whom it may concern:*

Be it known that I, JOHN M. BYRON, of New York city, in the county and State of New York, have invented a new and Improved Electric Railway, of which the following is a full, clear, and exact description.

My invention relates to improvements in that class of electric railways which use a sectional trolley wire or rail, the sections being insulated from each other, and each section being supplied, by a feeder, with the current from the main line.

The object of my invention is to produce a simple and comparatively inexpensive electric railway having a sectional trolley wire or rail, to provide an improved automatic means for switching the current successively through the sections of the trolley wire or rail, to arrange the several parts of the system in such a way that they may be perfectly insulated, to have very few mechanical parts to get out of order, to arrange the mechanism so that it may be easily repaired, to arrange the several switches so that if a number of them are damaged in any way the rest of the line will not be interfered with, and in general to produce a system which is adapted to supply the necessary power economically and without danger.

To these ends my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1:
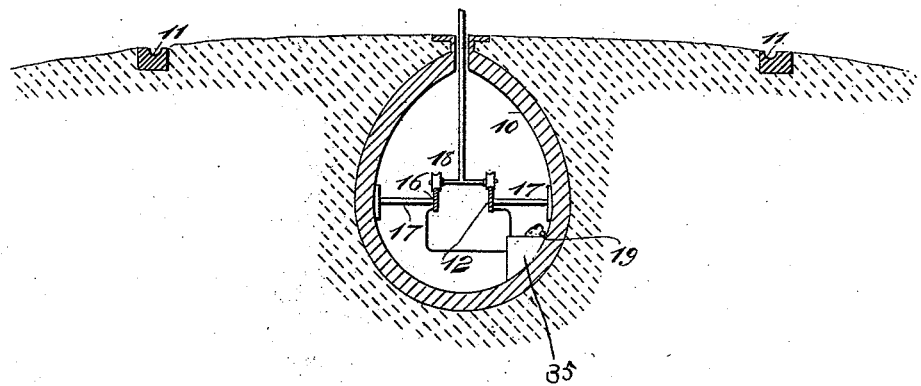
Figure 2:
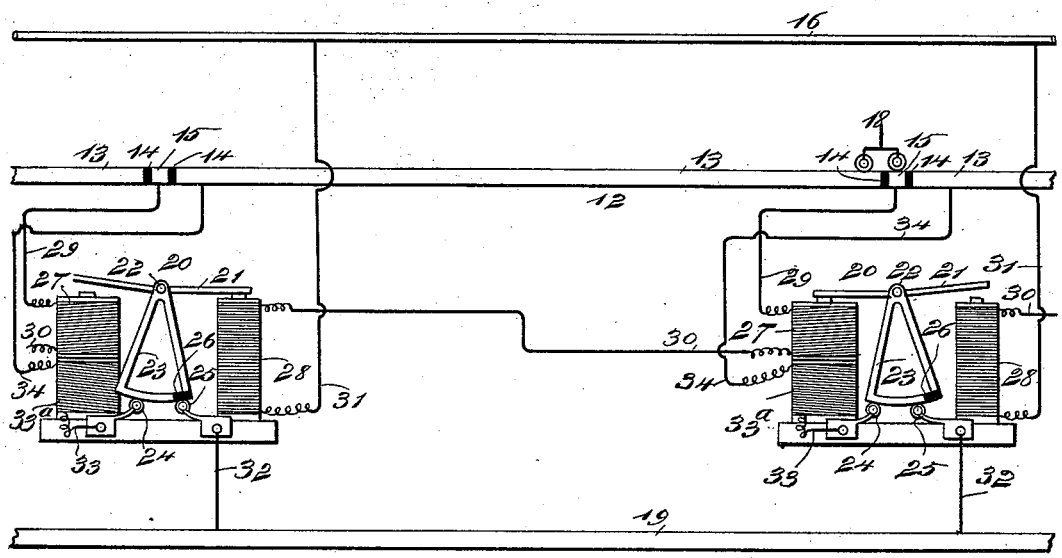

Figure 1 is a cross section of a railway, showing my improved system with the trolley wire arranged in a conduit, and Fig. 2 is a diagrammatic view of adjacent blocks of the railway and of my improved switch mechanism for cutting the current successively in and out.

In the accompanying drawings I have illustrated my improved railway in connection with an underground conduit, but from the description to follow, it will be evident that the system may be used in connection with either an overhead, underground or surface trolley conductor or rail.

As shown, the conduit 10 is arranged between the track rails 11 in the usual manner and may be of any approved construction. It has a trolley conductor 12 running longitudinally through it, this conductor being made up of sections 13 which are insulated from each other, as shown at 14, while between each pair of sections is a contact 15, which the trolley strikes and closes the circuit through a switch and cuts in the current on the next section of the wire 12 ahead, as will be hereinafter described.

The return circuit is through a wire 16 and both the conductor 12 and wire 16 are shown supported on brackets 17, but they may be carried in any convenient way. Connection is made with the wires by means of a trolley 18 which is not shown in detail, as it may be of any suitable construction, and the current may be returned through the trolley after passing through the motor of the car or the return current will pass through one of the rails 11 or any other suitable conductor, the arrangement shown being used simply to illustrate an operative system.

The main conductor 19 runs longitudinally through the conduit 10, but may be arranged in any convenient place, and the current is switched automatically through the sections 13 of the trolley conductor by means of switches 20 which are arranged adjacent to the ends of the sections 13, there being a switch for each pair of sections. The switch 20 has a double armature 21 which is pivoted in the middle, as shown at 22 and has a depending segmental portion or arm 23 which is adapted to touch the contacts 24 and 25, and as the current enters first through the contact 25, the segmental arm has an insulating portion 26 which is adapted to rest normally on the contact 25 and so cut out the current.

The armature 21 is tilted in one direction by a magnet 27 which cuts in the current to the next section ahead, as described presently, and in the opposite direction by a magnet 28 which cuts out the current as will also be described below. The magnet 27 connects by a wire 29 with the contact 15 of the trolley rail or conductor 12, and by a wire 30 with the magnet 28 of the next switch behind, and the magnet 28 is also connected by a wire 31 with the return wire 16. The current is led to the switch, from the main line 19, by a wire 32 and, after passing through the switch arm 23 and contact 24, it passes through a wire 33, a coil 33ª arranged beneath the coil 27, and a wire 34 to the section 13 of the trolley rail or conductor. The switches are held in water tight cases 35.

The operation of the mechanism is as follows: When the trolley 18 advancing toward the right strikes the contact 15, one wheel will be on the section 13 from which it has been receiving current, and the current will pass from the said section through the trolley, the contact 15, the wire 29 and coil 27, the wire 30, the coil 28 and the wire 31 to the return wire 16. When this is done, the coil or magnet 27 of the switch at the right pulls down one end of the armature 21 and moves the switch arm 23 so as to bring the conducting part thereof into contact with the contact 25, and the circuit then passes from the main line 19 through the wire 32, the contact 25, the switch arm 23, the contact 24, the wire 33, the coil 33ª and the wire 34 to the next section 13 of the trolley rail or conductor 12, so that when the trolley strikes this section the current will pass through the trolley and to the return rail or wire 16. At the same time the current passing through the coil or magnet 27 holds the armature 21 so as to maintain the current to the section 13 ahead, as described. The current also passes through the coil 28 of the next section behind and when the trolley leaves said section it tilts the armature 21 of such section so as to swing the insulating part 26 of the arm 23 opposite the contact 25, and thus the section 13, over which the trolley has just passed, is cut out. It will thus be seen that the trolley line is absolutely rigid, that there is no mechanism to be worked from mechanical contact with any portion of the car, and that the switch is automatically operated so as to cut in and out the successive sections of the trolley conductor, and the current is always supplied to the trolley while the line is under normal conditions, inactive and perfectly safe.

Having thus described my invention, I claim as new and desire to secure by Letters Patent—

1. In an electric railway, the combination, with the main-line wire, and a trolley rail composed of sections insulated from each other, and a trolley contact arranged between the sections, of the switch, consisting of oppositely-arranged magnets, a pivoted double armature, a sector-shaped arm, pendent from said armature and swinging with it, and having a portion of its arc insulated, two switch contacts on which such arc slides, and electrical connections between all the aforesaid contacts and other parts mentioned, as shown and described, to operate as specified.

2. An electric railway, comprising a trolley rail made up in sections insulated from each other and a contact between the sections, a main line wire, a switch consisting of a tilting armature and a contact arm, magnets 27 and 28 arranged at opposite ends of the switch armature, connections between the contact of the trolley rail, the magnet 27, the magnet 28 of the next switch behind and the return, and connections between the main line, the switch arm, and the next trolley rail section ahead, substantially as described.

3. The combination, with the sectional switch rail and the contacts thereon, of the magnets 27 and 28, the switch having the oscillating armature moved by the two magnets, a contact arm on the switch having an insulated section, connections between the contacts 15, the magnet 27 and the magnet 28' of the preceding switch and the return, contacts adjacent to the switch arm, a connection between the main line or supply and one of the contacts, and a connection between the other contact and the next forward section of the trolley rail, substantially as described.

JOHN M. BYRON.

Witnesses:
F. FERGUSON,
FRANK ABBOTT, Jr.